United States Patent [19]

Stiffler

[11] Patent Number: 4,789,562
[45] Date of Patent: Dec. 6, 1988

[54] PROCESS FOR MANUFACTURING HYDRATE SALTS-BASE GRANULE-SHAPED THERMAL ENERGY ACCUMULATORS WITH AN ADHERENT HERMETIC COATING, AND ACCUMULATORS OBTAINED BY SAID PROCESS

[76] Inventor: Mario Stiffler, Via Ai Ronchi, 6936 Cademario, Switzerland

[21] Appl. No.: 895,486

[22] Filed: Aug. 11, 1986

[51] Int. Cl.[4] .......................... B05D 7/00; B32B 5/16; F28D 15/00
[52] U.S. Cl. .............................. 427/221; 165/104.15; 428/407
[58] Field of Search ................ 427/212, 221; 428/403, 428/407; 165/104.15

[56] References Cited

U.S. PATENT DOCUMENTS

| 4,268,558 | 5/1981 | Boardman | 428/407 X |
| 4,505,953 | 3/1985 | Chen et al. | 427/213 X |

Primary Examiner—Michael Lusignan
Attorney, Agent, or Firm—Young & Thompson

[57] ABSTRACT

The process of the invention relates to the manufacture of hydrate salts-base thermal energy accumulators, designed to act as heat accumulators in plants for utilizing low temperature heat sources such as solar heat, domestic and industrial excess heat, and other heat sources currently not susceptible to economical utilization.

The anhydrous salts are fed to an inclined rotary drum in which they are simultaneously hydrated and granulated to different diameters from 1.5 mm to about 2.5 cm and beyond. The granules are then cooled classified into classes of uniform size, and finally treated with a powdered inert filler and/or a resin so as to obtain a coating perfectly adhering to their surface and hermetic towards both gas and liquid.

The accumulators obtained in this manner are used in plasters or concretes for the formation of masonry linings, in particular floor foundations, to act as heat absorption or emission elements in environmental conditioning systems; in the conditioning of articles of clothing and footwear; in heat storage reservoirs; in devices for waste heat recovery in industrial processes or certain domestic operations; and in refrigeration plants including those operating at a temperature of less than 0° C.

14 Claims, 2 Drawing Sheets

PROCESS FOR MANUFACTURING HYDRATE SALTS-BASE GRANULE-SHAPED THERMAL ENERGY ACCUMULATORS WITH AN ADHERENT HERMETIC COATING, AND ACCUMULATORS OBTAINED BY SAID PROCESS

BACKGROUND OF THE INVENTION

1. Field of the Invention

This invention relates to a process for manufacturing hydrate salt-based granulate-shaped thermal energy accumulators with an hermetic —i.e. water- and gas-proof—coating perfectly adhering to their surface, to the accumulators obtained by this process and to their use.

Hydrate salts—such as sodium, calcium and magnesium sulphates, phosphates, chlorides and nitrates in various degrees of hydration—are a particularly interesting material for thermal energy accumulation. In this respect they possess a high latent heat of hydration over a very wide temperature range, for example between $-20°$ C. and $+100°$ C., and are therefore very suitable for many applications, such as in solar energy plants and generally in all those plants in which a high thermal energy absorption/accumulation capacity is required at constant temperatures both less than and exceeding $0°$ C.

2. Description of the Prior Art

The use of these salts however has not, at least up to recent times, undergone adequate development as the aforesaid advantageous characteristics have always been accompanied by the serious drawback that after only a few solidification and fusion (i.e. hydration and dehydration) cycles, the salts permanently separated from their crystallization water, to thus loose all capacity for thermal accumulation in the form of latent heat.

After lengthy studies, the present Applicant discovered that this drawback could be obviated by enclosing hydrate salts in elementary cells having an internal volume of less than 100 cc and their three dimensions all of the order of centimeters. This discovery lies at the base of patent No. EU-A-0076897.

This patent also describes some processes for manufacturing these elementary cells. In these processes, the anhydrous salt is hydrated and melted in a suitable reactor, and then cast into plastics cells of different shapes. These cells are then sealed.

The aforesaid teachings have finally allowed manufacture of hydrate salts accumulators which are industrially useful, i.e. able to withstand a very large number of cycles without any permanent separation taking place between water of crystallization and salt inside the element, thus ensuring a practically unlimited useful life of the same.

The maufacturing processes shown in the specification No. EU-A-0076897 have however proved to be accompanied by certain problems. Firstly, the automation of these processes requires careful setting of the equipment for the preparation of the melted hydrate salt and its injection into the cells. Secondly, the cell sealing process, when filling is complete, must be carefully controlled in order to eliminate any air from each cell, and also because even a minimum weld imperfection—caused for example by hydrate salt residues in the welding region—leads to rapid deactivation of the cell by evaporation of the crystallization water there contained. Consequently it is not possible to obtain the high productivity required by the increasing market interest, and then the production cost of cells manufactured by these processes remains still too high and does not favour large-scale adoption.

SUMMARY OF THE INVENTION

The object of the present invention is therefore to provide an improved process which results in high productivity, at very low cost, of small-dimension hydrate salf-based thermal energy accumulators, free of trapped air and provided with an adherent coating perfectly water - and gas-proof.

The aforesaid object is attained according to the present invention by a process for manufacturing hydrate salt-based thermal energy accumulators, characterized by comprising a first step in which powdered anhydrous salt is hydrated with water and granulated, and a second step in which an adherent hermetic coating is formed directly on the granules thus obtained.

According to one characteristic of the invention, the salts are granulated simultaneously with their hydration within an inclined rotary drum having the internal shape of a right cylinder, the granule size being adjusted by varying the inclination and rotation speed of the drum.

According to a further characteristic of the invention, the adherent, hermetic granule coating consists of a hardened resin with or without the addition of an inert powdered filler.

BRIEF DESCRIPTION OF THE DRAWINGS

The invention will be now described in greater detail hereinafter with reference to the accompanying drawings in which.

DESCRIPTION OF THE PREFERRED EMBODIMENTS

Figure 1:
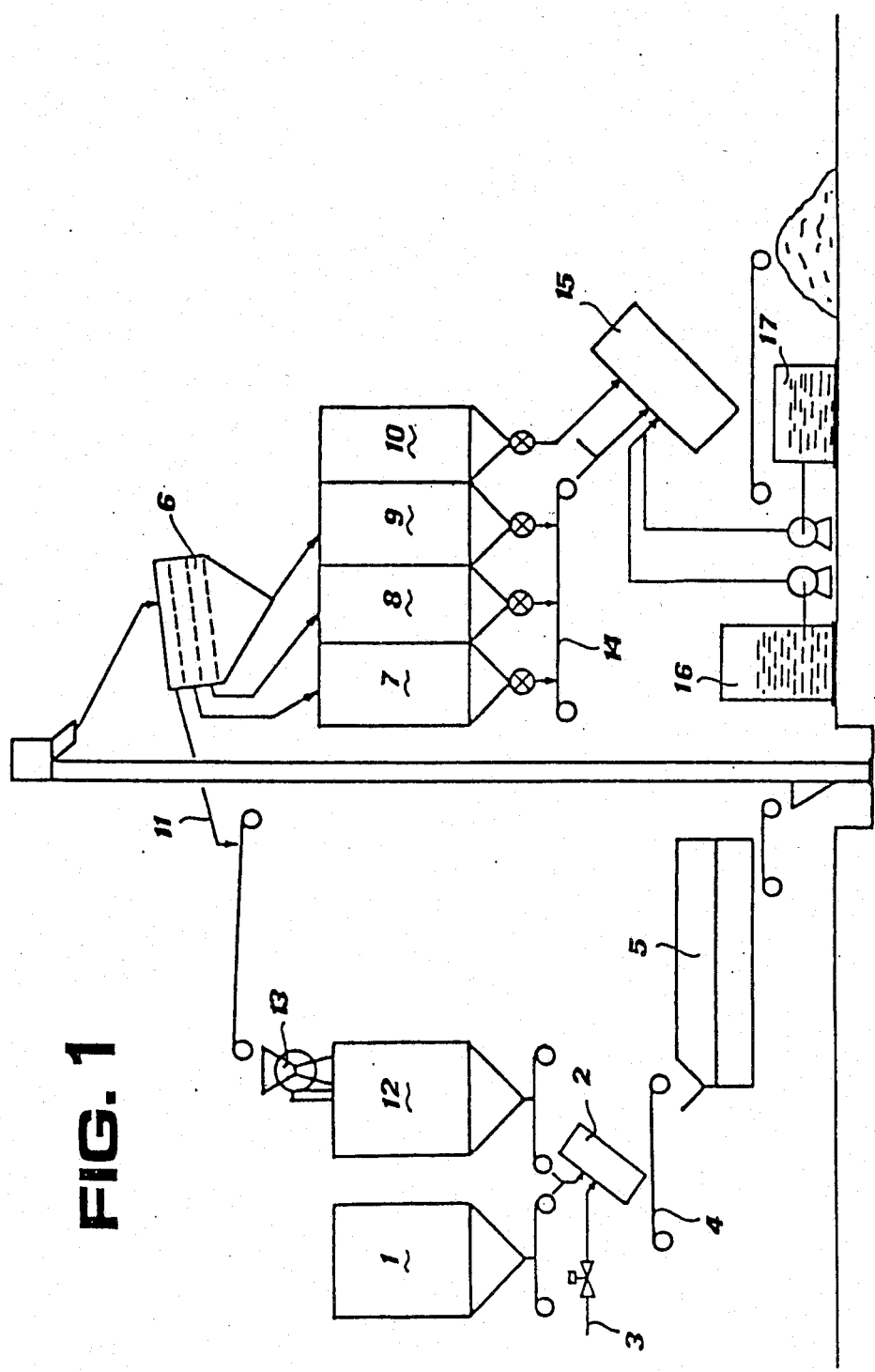
FIG. 1 is a first flow diagram of a plant in which the process according to the invention is implemented.

In the flow diagram of FIG. 1, the powdered anhydrous salt, forming the starting material for manufacturing the thermal energy accumulators in accordance with the process of the invention, is loaded into the hopper 1, and from here is fed by a conveyor belt or other suitable conveying means, to an inclined rotary drum 2. The drum 2 preferably has its inner walls of right cylindrical shape, and is therefore provided with a flat base perpendicular to the circular lateral wall. In addition, a fixed blade can be inserted into its interior to cause the material to fall and thus to mix.

Water is fed to the drum 2 from 3, by an atomizer device (not shown) which distributes the atomized water uniformly within the drum. The combined effect of the atomized water and of the movement of the drum 2 causes hydration of the powdered anhydrous salts and their agglomeration into granules of substantially spherical shape, which emerge from the mouth of the drum 2 as soon as the lower part of this latter is filled with material.

The throughput weight ratio of the fed anhydrous salt to water corresponds to the stoichiometric ratio of the anhydrous salt to be obtained. A convenient process for precisely controlling this feed thrughput ratio is to dispose within the drum 2 a humidity sensor, using this to control the water feed throughput in such a manner as to maintain the degree of humidity close to a predetermined constant value varying according to the degree of hydration to be obtained.

The size of the granules leaving the drum 2 depends on the residence time of each granule within the drum, and can therefore be easily adjusted by varying the inclination of the drum axis to the horizontal and/or the rotation speed of the drum, and possibly partly closing its mouth. For equal rotation speeds, minimum size is obtained when the axis of rotation is nearly horizontal, and larger sizes are obtained as more axis inclination is increased.

The granules obtained in this manner fall on to a conveyor belt 4 which feeds them to a cooler 5. The purpose of the cooler 5 is to mechanically consolidate the granules before the subsequent classification and coating steps. It can however be omitted if the difference between the melting point of the processed anhydrous salt and ambient temperature is sufficiently high to ensure good granule solidity.

If however the anhydrous salt has a melting point less than ambient temperature, the entire production plant must be cooled such that its temperature at each point is sufficiently less than the salt melting temperature.

The granules are then fed to a classifier 6 which—in the illustrated embodiment—divides the granules into three classes of uniform size, collected in respected hoppers 7, 8, 9, for the subsequent coating step. Any granules of excessively large size are discharged from the first stage of the classifier 6 and fed (11) to a hopper 12 after grinding in the mill 13. The contents of the hopper 12 are then recycled to the drum 2. It should in any event be noted that after an initial start-up period, ie when the drum 2 has reached steady conditions, the size of the granules obtained is very stable at around the required value.

The granules stored in the hoppers 7, 8 and 9 are not ready for coating, and are fed to the coating apparatus by a conveyor belt 14 or other similar device. As stated, the adherent, hermetic coating consists of a resin which can be applied either as a single-component product dissolved in a solvent, or preferably as a two-component product. In either case, the serious problem of the tendency of the granules to become tacky and stick together during the drying or polymerization of the resin distributed on them has to be solved.

The resin used can be any commercial resin of either natural or synthetic type, but preferably two-component resins are used. Particular preference is for the use of isocyanates in association with a suitable hardener, such as toluene, to form a polyurethane coating.

In the embodiment shown in FIG. 1, the above mentioned problem is solved by adding an inert powdered filler, which uniformly distributed on the granules, prevents their stickness. The coating is formed within a second inclined rotary drum 15 provided with suitable internal mixing devices of known type. Processing within the drum 15 can be either continuous or batch.

In the first case, the drum 15 is similar in operation to the drum 2. The granules to be coated, an inert powdered filler from the hopper 10, and an atomized jet of resin from the tank 16 are fed simultaneously into it. In the preferred case in which two-component resins are used, the tank 16 is associated with a tank 17 containing the second component (catalyst or hardener), which is mixed with the basic component (monomer) immediately prior to being fed into the drum 15. The combined action of the inert filler, the resin and the movement of the drum 15 causes a resistant hermetic coating to form about each granule, its thickness depending on the inclination of the drum 15 and its rotation speed.

In the second case, the drum 15 is fed with a batch of granules and is then closed. The required quantity of resin is fed from the tanks 16 and 17 while the drum 15 is kept rotating. When the resin has been uniformly distributed on the granules and begins to harden, a predetermined quantity of inert powdered filler from the hopper 10 is fed by a compressed air device of known type (not shown) into the drum 15. This filler becomes distributed within the drum 15 to adhere to the granules wetted by the resin and form with it the required hermetic coating around the granules. If a larger coating thickness is desirable, the cycle can be repeated more than once, before proceeding with a new batch of granules.

It should be noted that the coating obtained by the aforesaid processes completely adheres to the hydrate salt granule and any air inclusion between the coating and granule is therefore completely prevented, air presence being particularly harmful in thermal energy accumulators of this type as it favours mobility of the hydrate salt and thus facilitates separation of the salt from its water of crystallization.

The granules discharged from the drum 15 are ready for use, and have a dimeter which can be varied at will between 1.5 and 50 mm. Beyond this maximum size, the granules comprise shape irregularities which limit easy application.

It is particularly advantageous to use microgranular amorphous silica as the powdered inert filler, this being easily obtainable at low cost as a waste product of quartzite processing. This inert filler is particularly advantageous because of its low cost, because of the strength which it gives to the coating, and finally because it can be conveyed pneumatically by virtue of its very small particle size ($1-3\mu$), and when injected under pressure into the drum 15 it becomes distributed therein in a perfectly uniform way.

Figure 2:
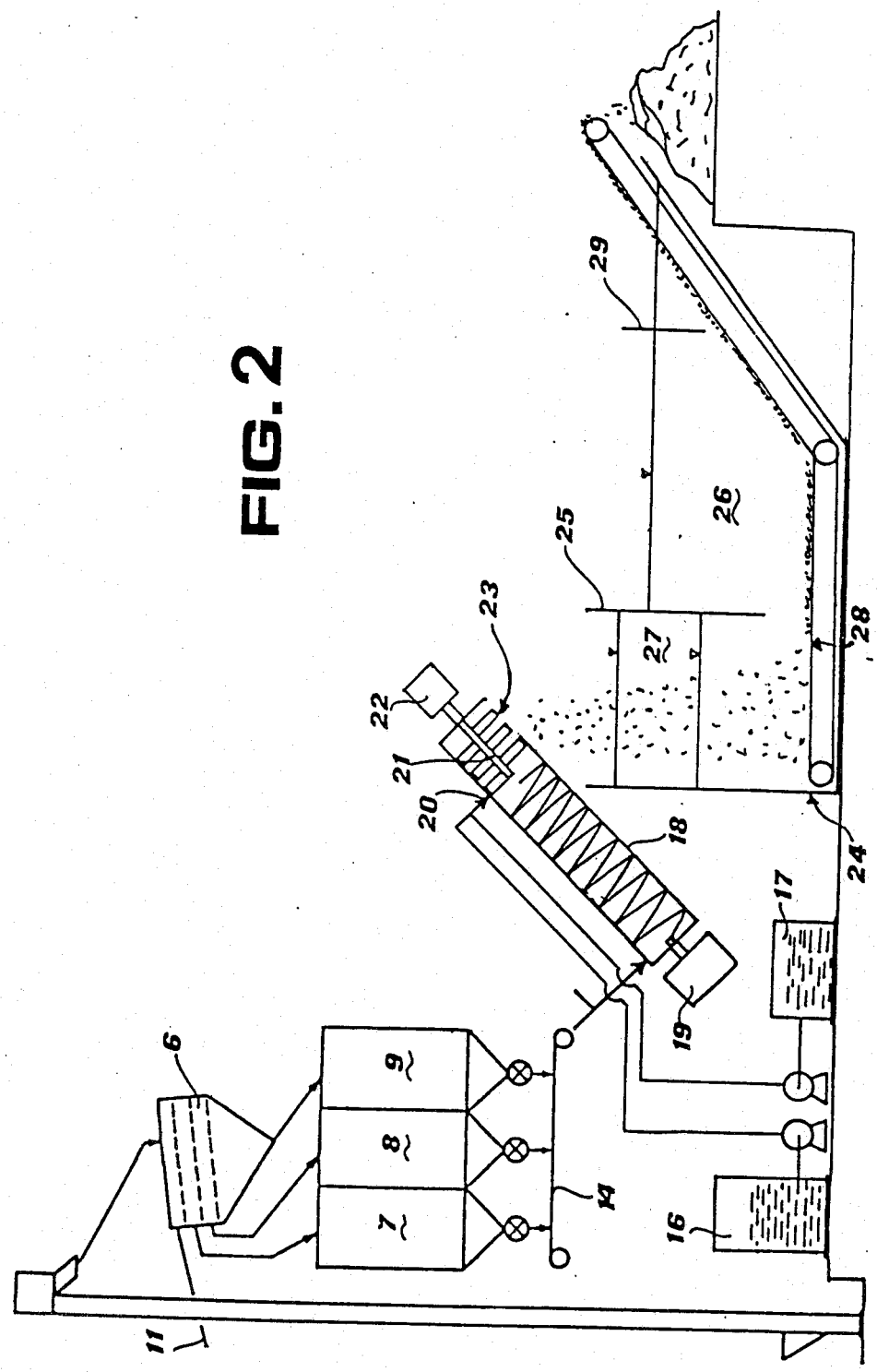
FIG. 2 is a second partial flow diagram of a plant with a different embodiment of the granule coating step.

In the preferred embodiment shown in FIG. 2, the problem of tackiness and/or sticking together of the granules during the coating formation step is solved by a special process which allows physical separation between the individual granules to be maintained during polymerization of the resin coating.

As shown in FIG. 2, the granules conveyed by the conveyeor belt 14 are fed into the base of an inclined screw conveyor 18, the screw of which is driven by a motor 19 by which the granule throughput is adjusted. The screw of the screw conveyor 18 extends into the conveyor only for a part of it, and terminates slightly before the point 20 at which the two-component resin is fed. This is fed by a series of nozzles (not shown) arranged to distribute it within the mass of granules. Above the resin feed point 20, the mass of granules wetted by the resin moves forward with a piston movement along the conveyor 18, and is continuously mixed by a mixer/scraper 21 mechanically independent of the conveyor 18 and driven by a motor 22. The mixer/scraper 21 has the double purpose of homogenising the resin and distributing it on the surface of the granules, and of keeping the inner walls of the conveyor 18 clean. It can be easily removed to allow resin residues and granules to be cleaned from this region to the conveyor 18, for example during plant shut-down.

The liquid resin-coated granules now undergoing polymerization are expelled from the mouth 23 at the top of the conveyor 18 and fall into a tank 24. The purpose of the tank 24 is to allow complete polymerization and thus hardening of the resin layer on each granule, while keeping each granule physically separated from the adjacent granules during the entire polymerization stage.

To attain this objective, the tank 24 is divided verically by a baffle 25, which does not reach the tank bottom. The tank is filled with water 26 and molten paraffin 27, in such a manner that the melted paraffin 27 lies on only one side (to the left in FIG. 2) of the baffle 25. The two liquids are maintained at a constant temperature of about 65° C. by electric heaters or other known means, not shown.

The resin-wetted granules which fall into the tank 24 firstly encounter the layer of melted paraffin 27 which, because of the temperature difference (the granules being at approximately ambient temperature or lower), forms on them a solid film which isolates each granule from the adjacent one so preventing them sticking together. Moreover, the heat of the paraffin accelerates the polymerization process, which is completed within the time each granule takes to pass through the layer 27. This time can be adjusted at will either by increasing the depth of the layer 27 or by increasing its viscosity by suitable additions of thickening agents.

When the granules leave the layer 27, a perfectly adherent, hermetic coating of hardened resin is already formed on them. The solid paraffin which still encloses said coating is rapidly dissolved by the underlying hot water 26, and rises to the layer 27 by virtue of its different density. When the coated granules reach the bottom of the tank 24, on which a conveyor belt 28 is disposed, they are thus perfectly free of any paraffin residue, and their now completely solidified coating creates no further problem of tackiness or lump formation. The conveyor belt 18 then conveys the thus coated granules out of the tank 24, from the side to the right of the baffle 25 which thus contains only water, where they are withdrawn for subsequent packaging and despatch. Any paraffin surface layer on the right side of the tank which forms after prolonged use of the plant can be contained by a second baffle 29 disposed in the vicinity of the exit point of the conveyor 28, this layer being periodically collected and transferred to the layer 27.

The accumulators manufactured by the aforesaid method have many application:

they can be mixed with mortars, plasters and concretes, including the bituminous type ones, for the formation of floor foundations, other masonry linings and road subgrades. In this kind of application they can act as simple structure temperature stabilisers, either to prevent ice formation or to prevent excessive overheating (for example in aircraft runways or highways in equatorial regions), or, in combination with hydraulic circuits containing a heat transfer fluid, they can form surfaces able to emit or absorb heat; a specific application being in the environmental conditioning field;

they can be used immersed in heat transfer fluids in central heat storage reservoirs;

they can be inserted into articles of clothing and footwear for isothermal conditioning of the person, especially in winter wear;

they can be used in low-boiling fuel evaporators for operating "cold" engines and turbines;

they can be used in saline water evaporators in desalination plants;

they can be used in refrigeration plants, including those operating at a temperature of less than 0° C., either as temperature stabilising or safety elements, i.e. able to absorb or compensate any fluctuations or faults in the main plant, or as refrigeration elements for example in perishable goods transport containers without their own refrigeration system. In this latter case, the refrigeration elements obviously have to be periodically "recharged" in a refrigerator, when all the hydrate salts contained therein are completely melted.

From the aforegoing it is apparent that the object of the invention has been completely attained. In this respect, the described method uses extremely simple and low-cost raw materials, so that the final cost of the accumulators is particulary low. It is also suitable for mass production, and enables accumulators of different size to be made available to satisfy any applicational requirement. Finally, a most important characteristic, the coating obtained adheres perfectly to the hydrate salt granule and is perfectly hermetic, besides having sufficient mechanical strength, so that the problems of known thermal accumulator cells, already described in detail heretofore, are all obviated.

The invention has been described with reference to preferred embodiments, but also covers any modification available to an expert of the art which may be necessary in order to adapt the described process to individual operating conditions.

I claim:

1. In a process for manufacturing hydrate salt-based granular thermal energy accumulators, comprising the steps of forming granules of hydrated salt and forming an adherent hermetic coating directly on said granules; the improvement in which said granules are formed by feeding powdered anhydrous salt to an inclined rotating drum and spraying water onto said anhydrous salt contained in said drum in a stoichiometric amount effective to convert said anhydrous salt to said granules of hydrated salt, said drum having an angle of inclination and a rotational speed effective to form said granules of a desired size.

2. A process as claimed in claim 1, and forming said adherent hermetic coating directly on said granules by coating said granules with a two-component resin in an inclined rotating drum.

3. A process as claimed in claim 1, wherein said coating consists of a resin and is formed by the following steps:
covering the granules with a layer of liquid resin;
hardening the resin within a liquid paraffin bath of temperature greater than the temperature of the granules;
eliminating in a hot water bath the paraffin which solidifies on the granules.

4. A process as claimed in claim 3, wherein said resin is a two-component synthetic resin, preferably polyurethane based.

5. A process as claimed in claim 1, wherein said coating consists of a resin and is formed by the following steps:
covering the granules with a layer of liquid resin;
mixing the resin-wetted granules with an inert powdered filler;
hardening the composite resin/inert powdered filler layer.

6. A process as claimed in claim 1, for processing hydrated salts having a melting point less than ambient temperature, wherein all the processing steps take place under cooling, and the temperature at each point of the plant is less than the melting point of the hydrate salt.

7. A process as claimed in claim 4, wherein the paraffin bath floats on the water bath.

8. A process as claimed in claim 7, wherein the granules are covered with a layer of liquid resin beyond the upper end of the screw of a screw conveyor by a plurality of resin jets, the resin being homogenized and dispersed on the surface of the granules by a mixer which is mechanically independent of the screw conveyor.

9. A process as claimed in claim 5, wherein the granules are covered with a layer of liquid resin and mixed with an inert powdered filler within a rotary drum into which the resin and inert filler are fed separately.

10. A process as claimed in claim 1 wherein the anhydrous salts are hydrated within the drum by one or more atomized water jets.

11. A process as claimed in claim 1, wherein the granules have a size variable between 1.5 and 50 mm.

12. A process as claimed in claim 1, wherein the granules are consolidated by cooling between the granulation and coating steps.

13. A process as claimed in claim 1 wherein the granules are classified according to their size between the granulation and coating steps.

14. A process as claimed in claim 13, wherein those granules which exceed the maximum required size are recycled to the granulation step after grinding.

* * * * *